Jan. 19, 1971     A. J. MESSIER     3,556,589
COMBINATION SNACK TRAY AND BACKREST
Filed Dec. 12, 1968
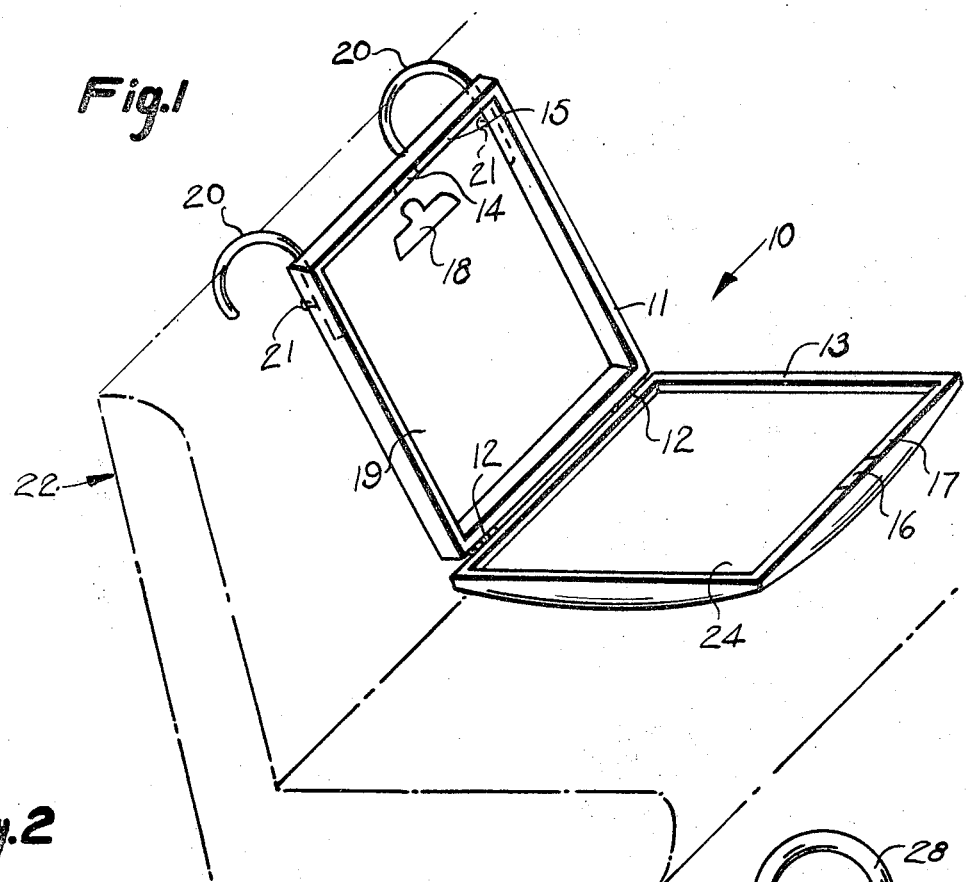
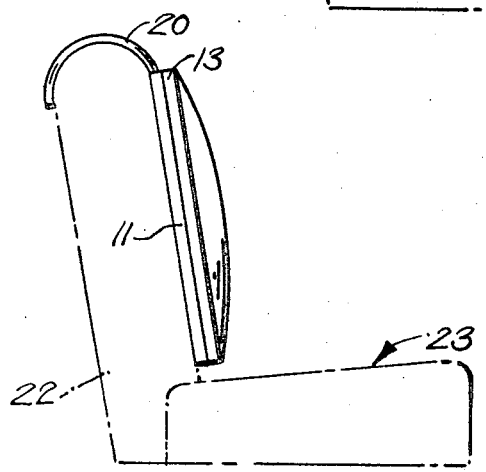
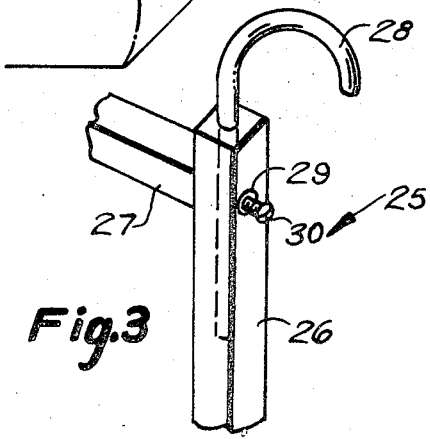
INVENTOR.
*Albert J. Messier*

United States Patent Office 3,556,589
Patented Jan. 19, 1971

3,556,589
COMBINATION SNACK TRAY AND BACKREST
Albert J. Messier, Mendon St.,
Blackstone, Mass. 01756
Filed Dec. 12, 1968, Ser. No. 783,216
Int. Cl. A47c 7/42
U.S. Cl. 297—230                              2 Claims

ABSTRACT OF THE DISCLOSURE

A collapsible snack tray for automobiles having two halves which are foldable along the seat back of an automobile as a backrest.

This invention relates to automotive utility devices and more particularly to a combination snack tray and backrest.

It is therefore the main purpose of this invention to provide a combination snack tray and backrest device which when the two halves are folded will form a backrest has means at each end to suspend itself from the back of the seat of the motor vehicle.

Another object of this invention is to provide a combination snack tray and backrest which will be a utility device for serving many purposes and the device will be particularly useful in serving food and the like.

A further object of this invention is to provide a combination snack tray and backrest which will be useful to families when attending drive-in movies and one which will have hook means which are adjustable in order to accommodate seats of various heights and the hinged portion is of the type having the hooks which can be used to rest food, beverages and may also be used for writing upon.

Other objects of this invention are to provide a combination snack tray and backrest which is simple in design, inexpensive to manufacture, rugged in construction, easy to use and efficient in operation.

These and other objects will become readily apparent upon a study of the following specification together with the accompanying drawing wherein:

FIG. 1 is a perspective view of the present invention;

FIG. 2 is a side view of the device showing a closed position;

FIG. 3 is a fragmentary perspective view of a modified form of hanger for the invention; and FIG. 4 is a horizotnal elevation of the insert and screw shown in section and removed from FIG. 3.

According to this invention, a combination snack tray and backrest 10 includes a hollow rectangular frame 11 hinged by a pair of hinges 12 to a hollow rectangular frame 13. The exterior of frames 11 and 13 are covered with plastic material and may be made of any suitable material. A magnet 14 is secured flush with edge 15 of frame 11 and a similar magnet 16 is secured flush within the edge 17 of frame 13 and provides magnetic fastening means for frames 11 and 13 when they are folded closed. A spring clip of a conventional form 18 is secured to wall 19 within frame 11 and provides a means for holding various papers and the like. To the outside of wall 19 are secured a pair of spaced apart and plastic covered hooks 20 which are secured to wall 19 by means of suitable screw faseners 21. The hook of frame 11 engages over the upper portion of the seat back 22 and the frame 13 when the device is open, extends horizontally across and forwardly of seat back 22 on the vehicle's seat 23. The panel 24 of frame 13 serves as a tray for the placement of food, beverages and also serves as a writing surface when so desired.

Device 10 is used as a backrest when frames 11 and 13 are folded together, whereupon the magnetic force of magnet 14 and 16 will secure the two closed, whereupon device 10 will serve as a comfortable backrest when not in use. In order to use device 10 as a utility table the frames 11 and 13 are pulled apart and beverages and food can be conveniently placed upon the panel 24 which then serves as a tray. The frame 13 and its associated panel 24 may be also used as a temporary desk by the panel 24 serving as a writing surface.

Looking now at FIG. 3 of the drawing, one will see a modified form of back frame 25 having wooden side members 26 (one of which is shown). To the side members 26 are secured fixedly a wooden cross member 27 and extending from the interior of said members 26 is a plastic covered hook 28 for supporting frame 25 from a seat back of an automobile and inset 29 secured within the side member 26 of frame 25 threadingly receives a screw 30 which provides for adjustment to the height of the hooks 28 and serves as set screw means to maintain the hook 28 in a stationary condition.

What I now claim is:

1. A combination device that is usable as a snack tray or backrest on the front seat of an automobile having a seat portion and a back portion, a first frame member including a wall that is receivable in flush engagement with the back portion of said front seat and that extends substantially the full height thereof, means for mounting said first frame member on said back portion, a second frame member hingedly secured to the bottommost edge of said first frame member and having a configuration generally corresponding to said first frame member so as to enclose said first frame member when said device is used as a backrest, said second frame member including tray panel at the inner surface and a panel on the outer surface of which a rest portion is formed that an occupant leans against when the device is used as a backrest and that engages the seat portion of the front seat when the second frame member is unlocked from the first frame member and is pivoted downwardly therefrom, wherein the seat portion supports said second frame member in a substantially horizontal position, said first frame member mounting means including spaced supporting members that are connectable to said first frame member and that extend upwardly therefrom for engagement with the top of the back portion of said front seat, and means for adjusting said supporting members relative to said first frame member so as to locate the hinge axis of the frame members in that position that will enable the tray panel of said second frame member to be horizontal when the second frame member is hingedly moved to the open position on said seat portion.

2. A combination device as set forth in claim 1, said first frame member having side walls that cooperate with the wall thereof to form a compartment for receiving articles therein, said compartment being enclosed by said second frame member when said second frame member is located in the closed position for use as a backrest.

References Cited
UNITED STATES PATENTS

| | | | |
|---|---|---|---|
| 275,991 | 4/1883 | Case | 312—235 |
| 361,882 | 4/1887 | Luft | 297—191 |
| 1,216,287 | 2/1917 | Corbin | 297—256 |
| 1,329,988 | 2/1920 | Montgomery | 297—146 |
| 1,548,285 | 8/1925 | Rogers | 297—231 |
| 1,559,425 | 10/1925 | Hehn | 297—112 |
| 2,634,794 | 4/1953 | Young | 297—255 |
| 2,637,372 | 5/1953 | Angelo | 297—254 |
| 2,889,051 | 6/1959 | Kramer | 108—144X |
| 3,031,242 | 4/1962 | Sawle | 312—235X |
| 3,287,051 | 11/1966 | Anderson | 248—206A |

FRANCIS K. ZUGEL, Primary Examiner

U.S. Cl. X.R.

108—44; 297—254